UNITED STATES PATENT OFFICE.

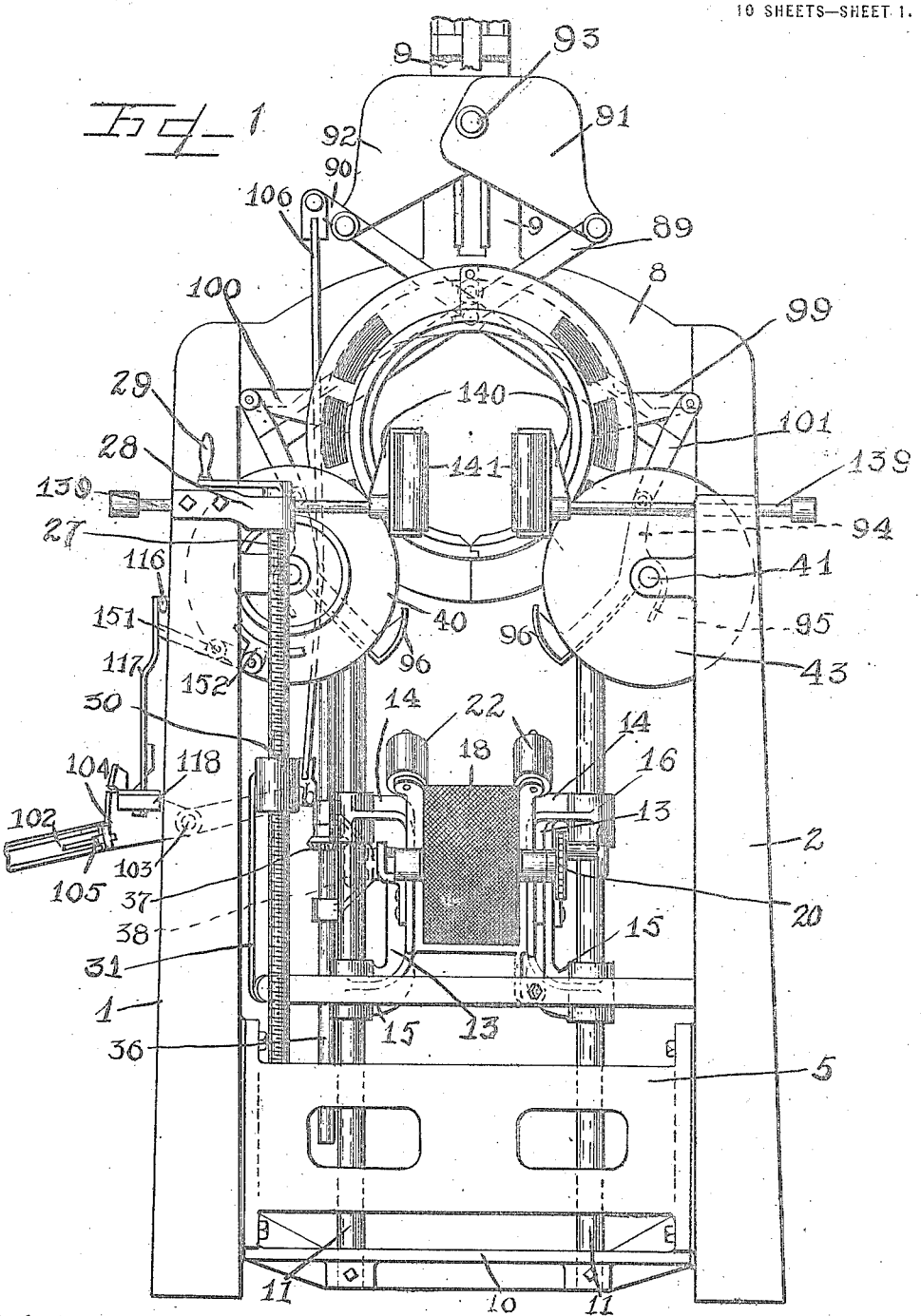

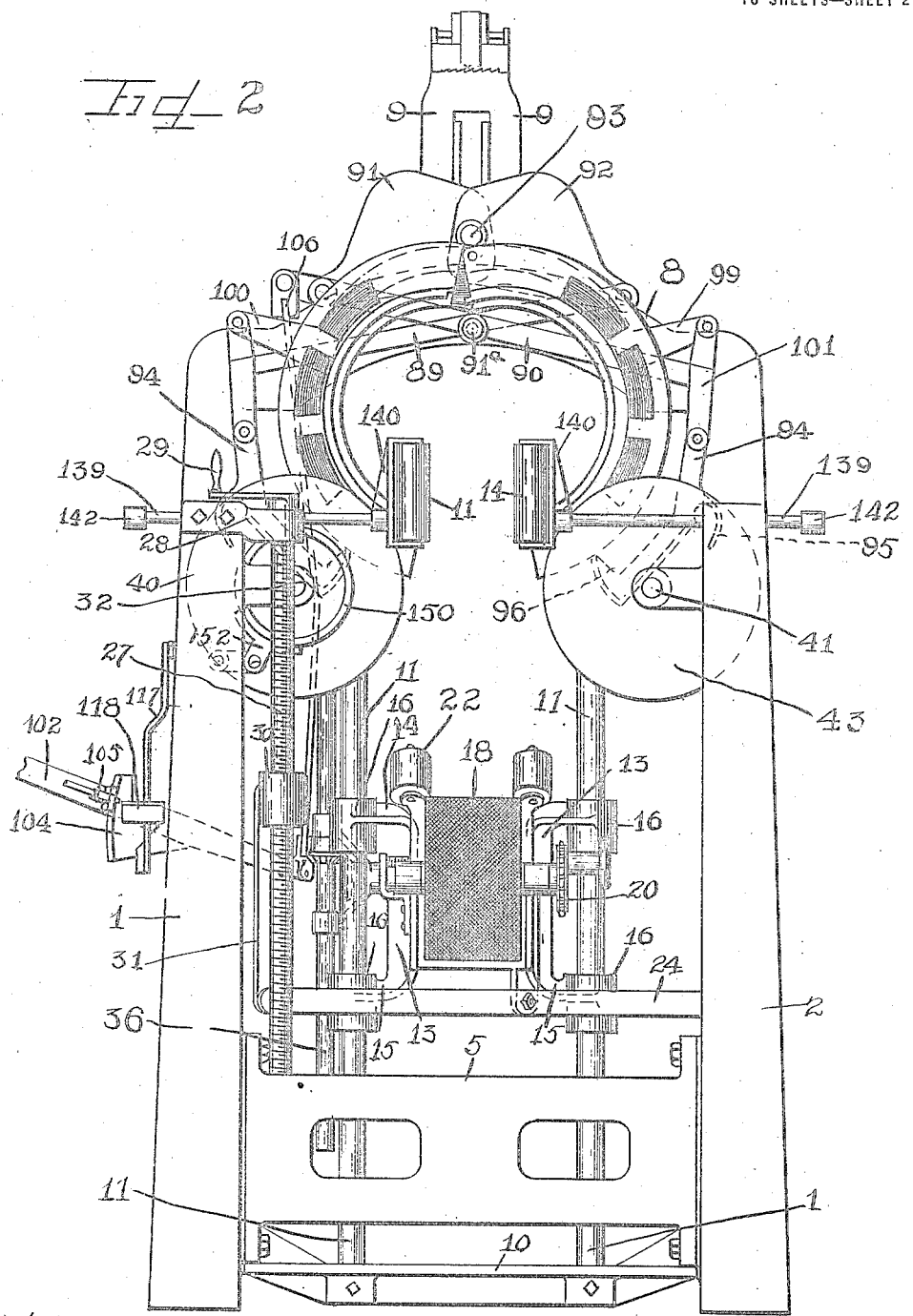

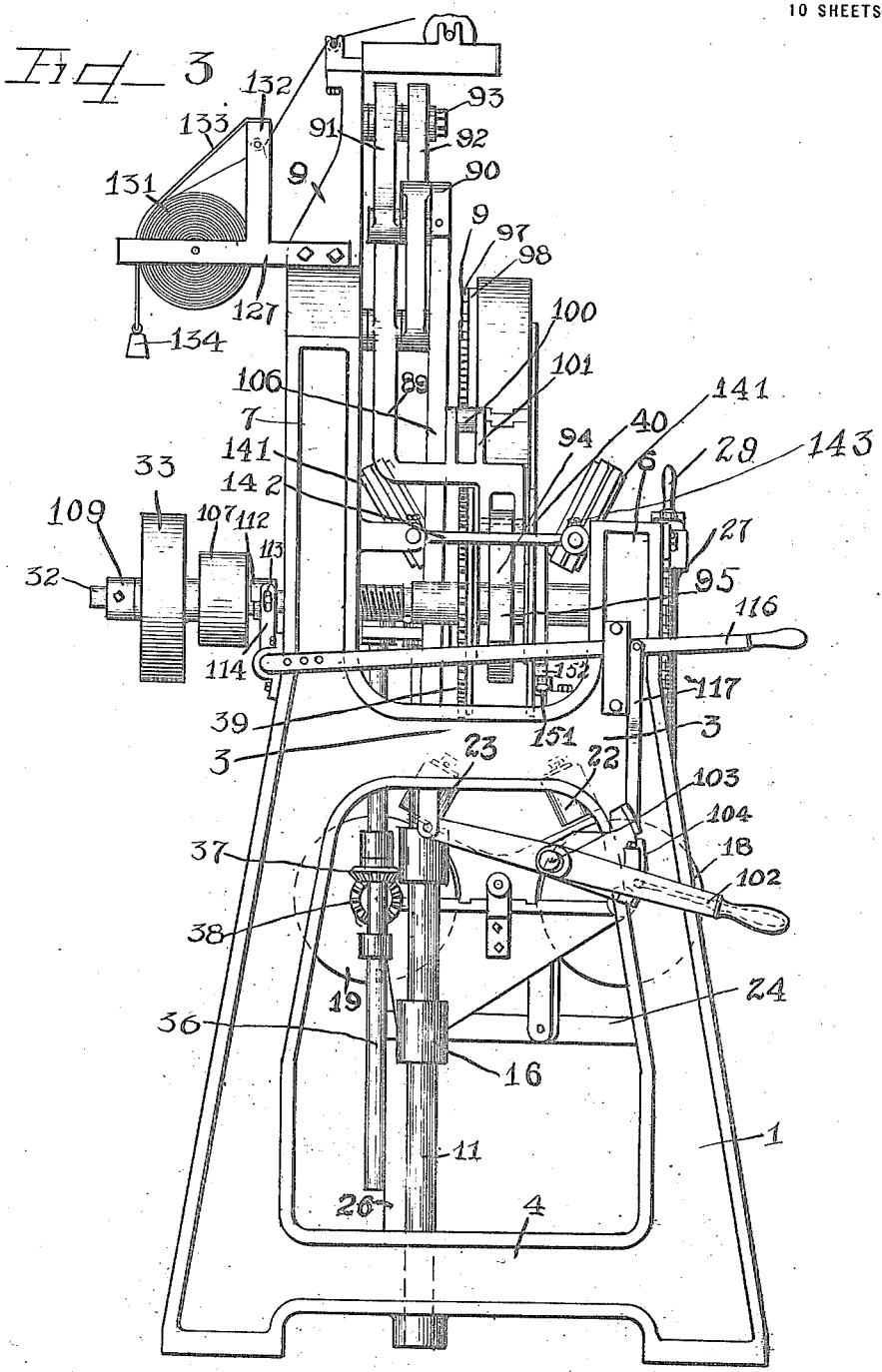

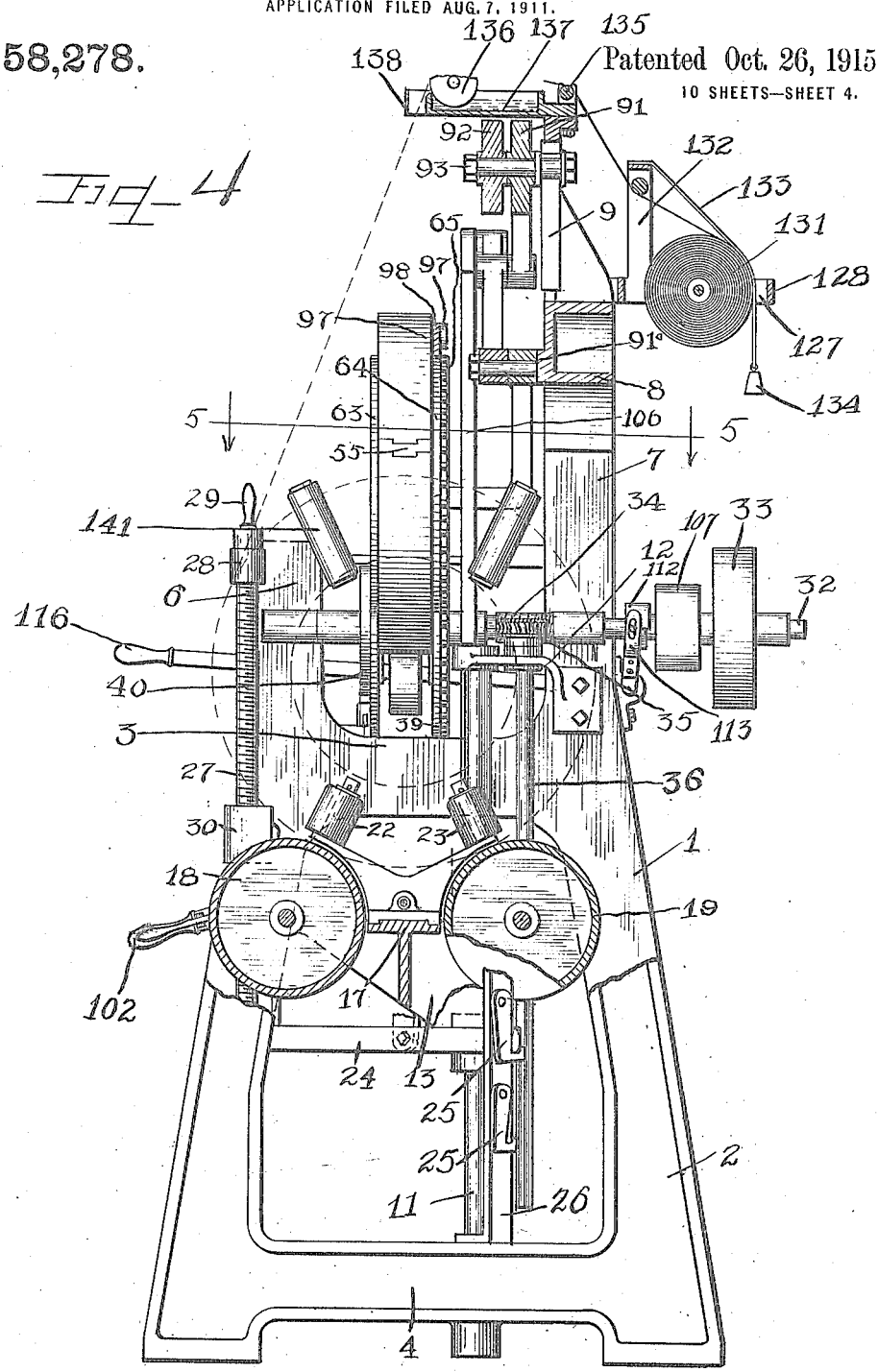

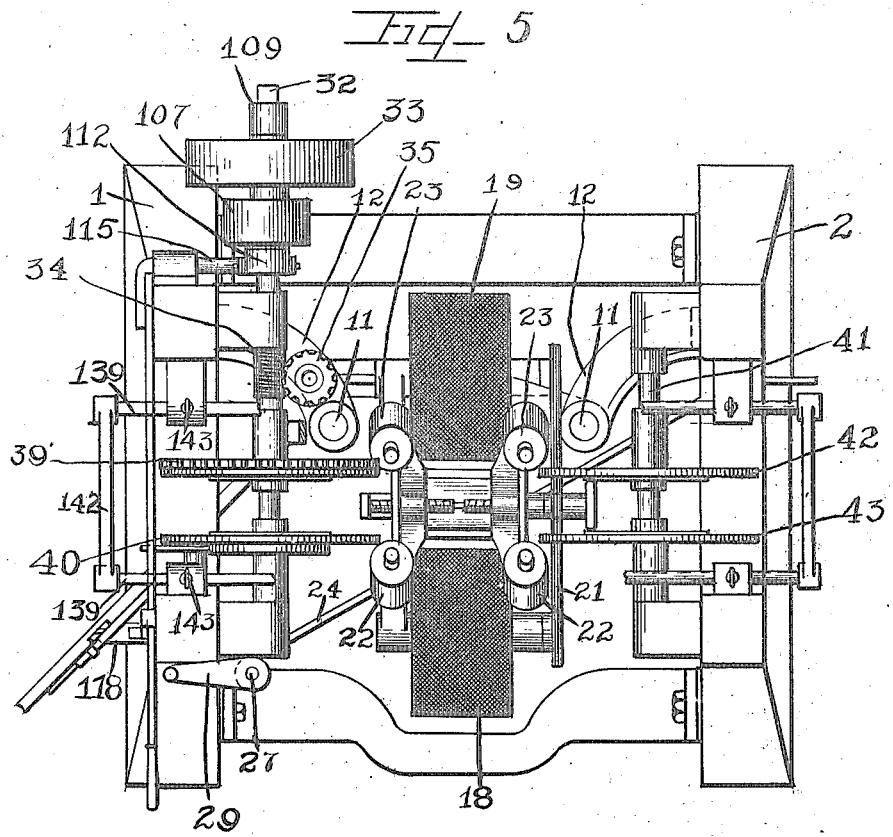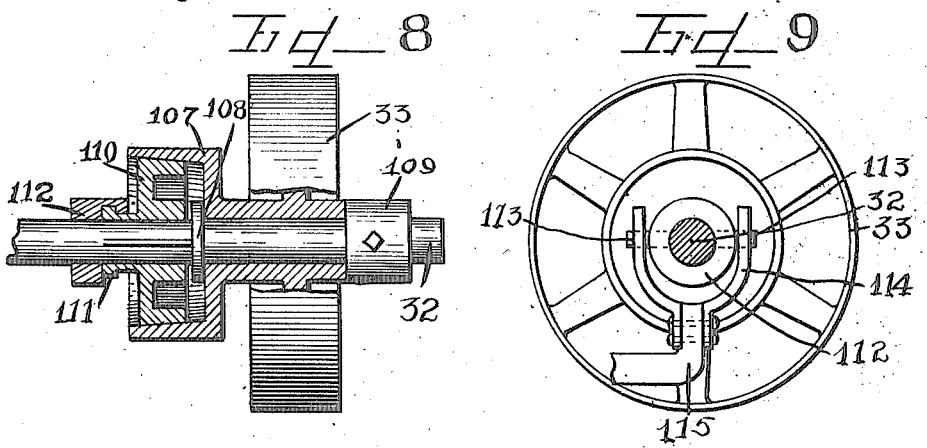

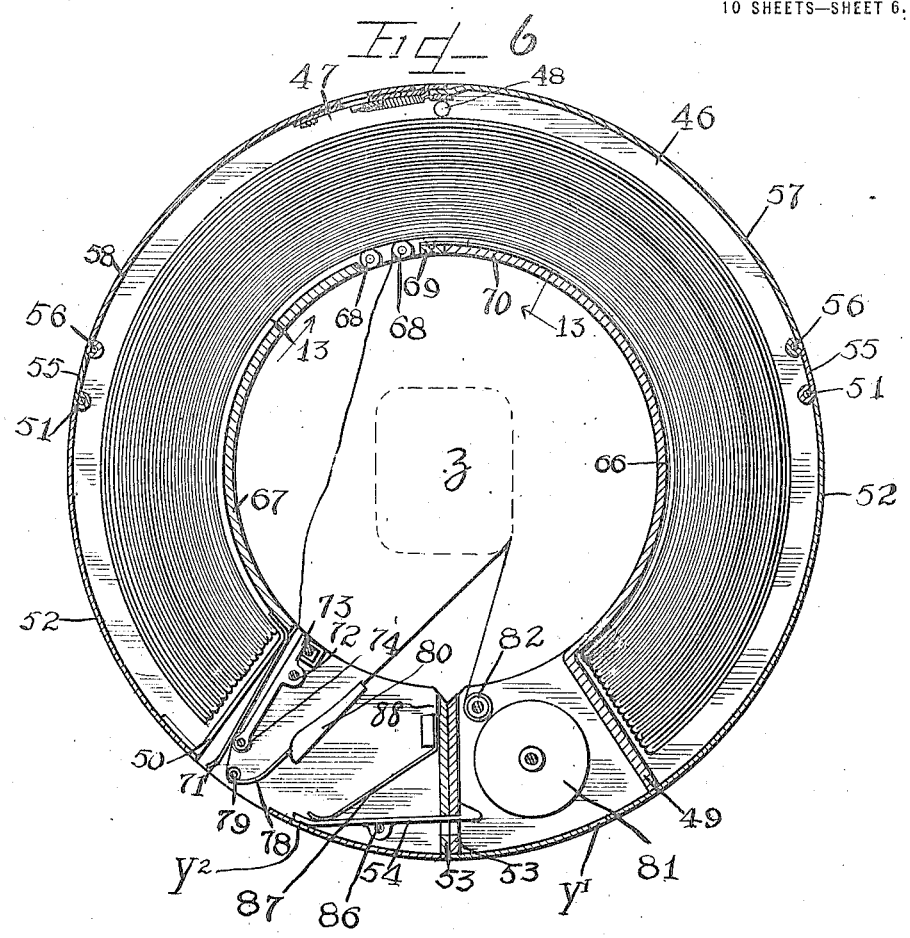
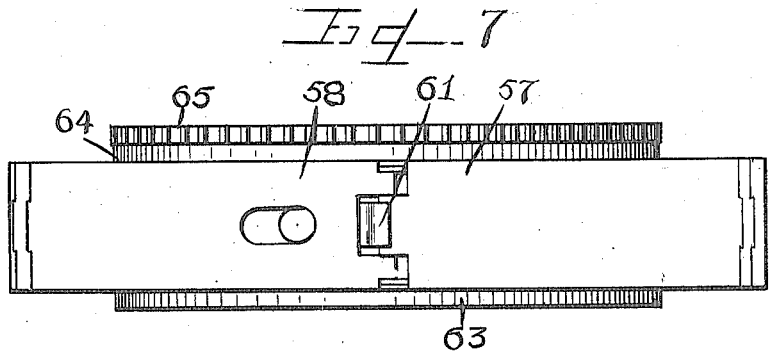

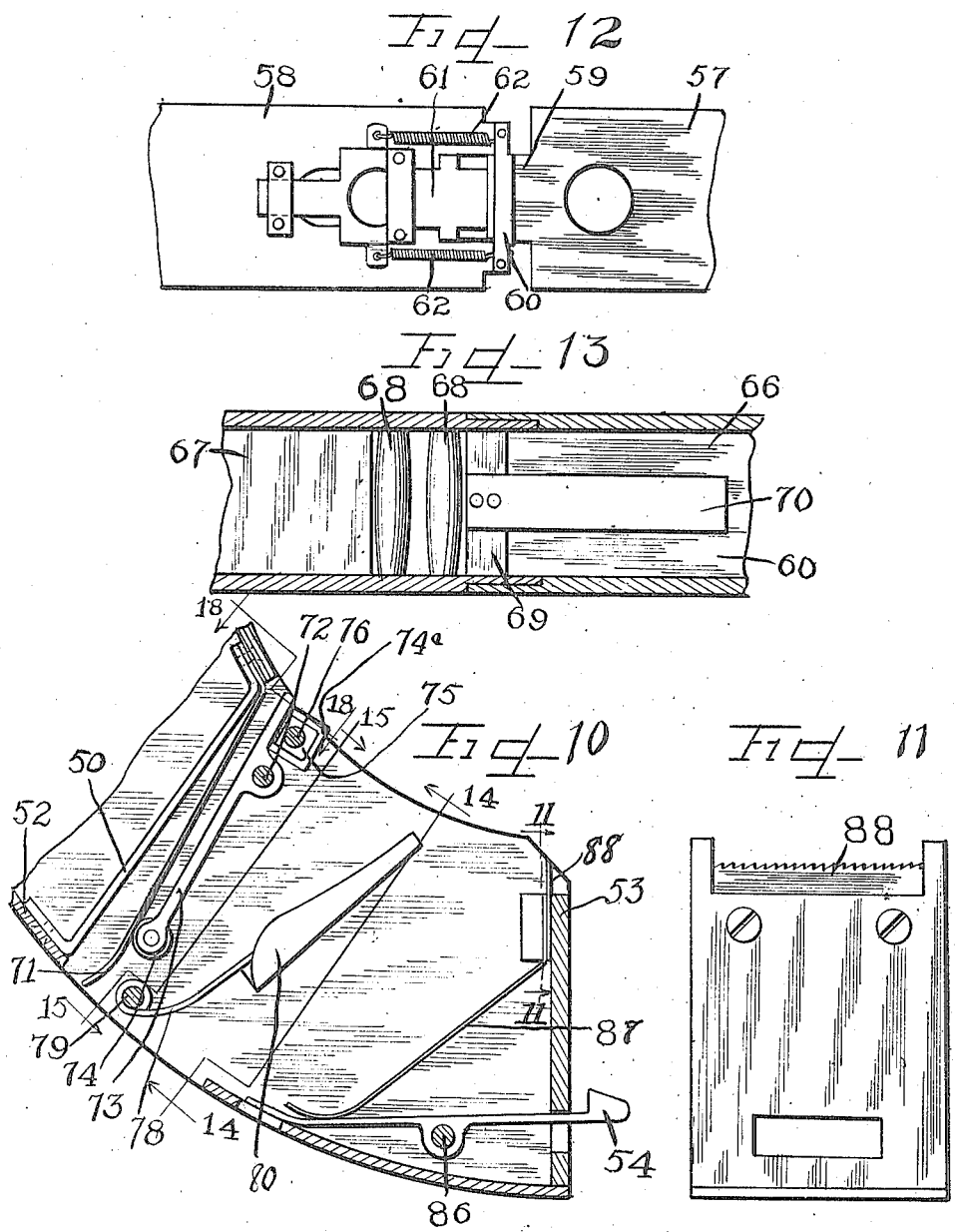

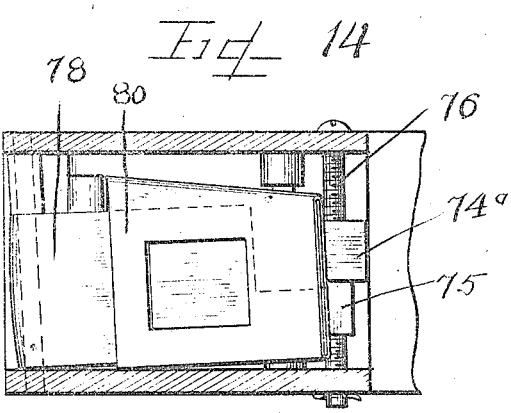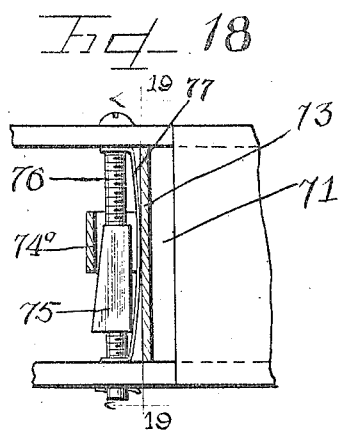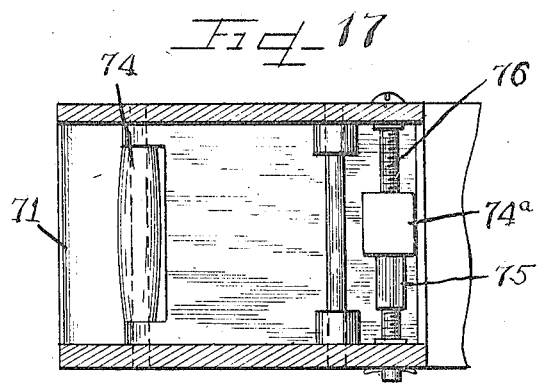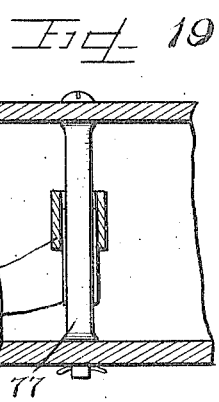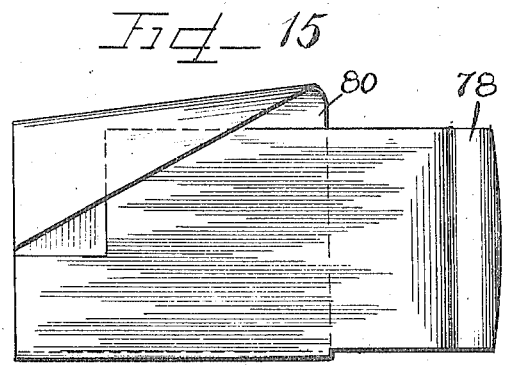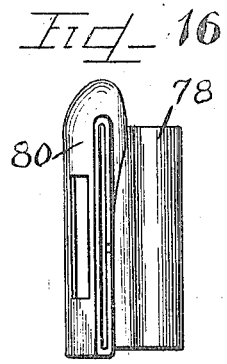

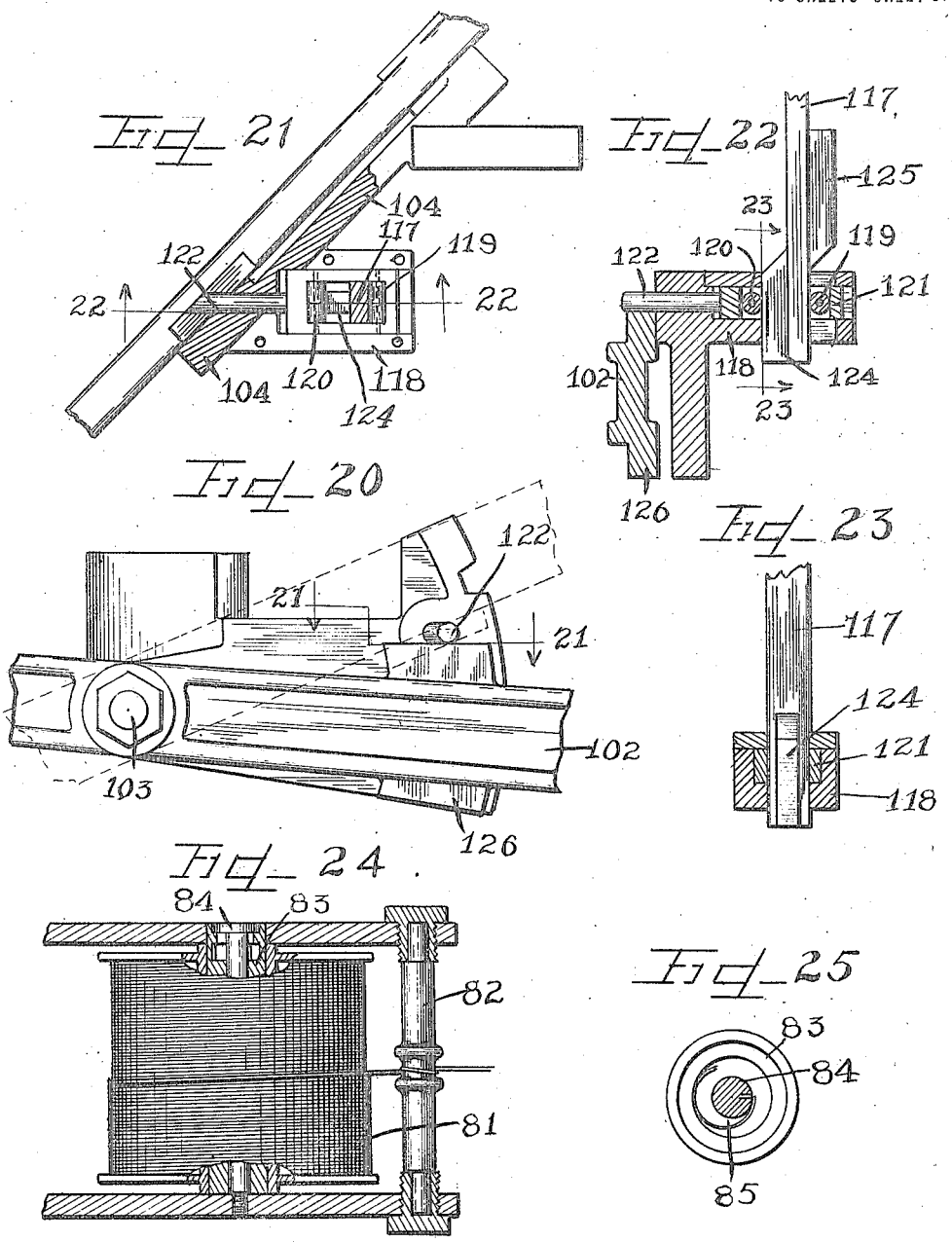

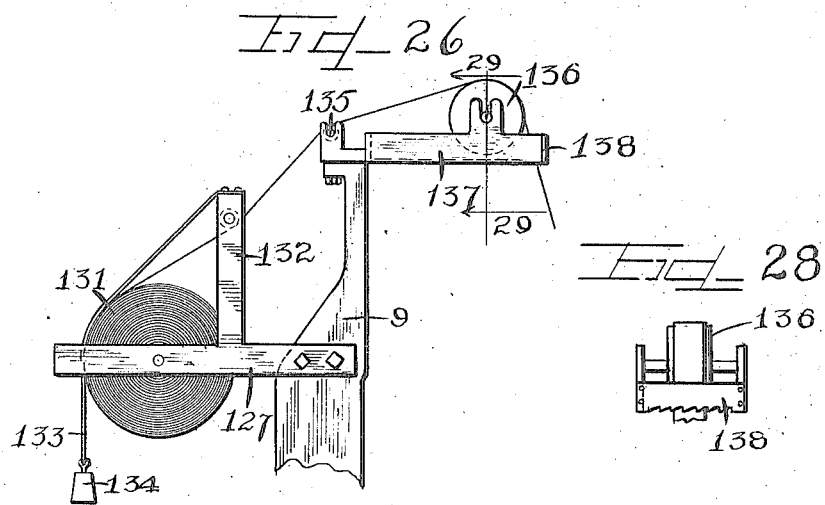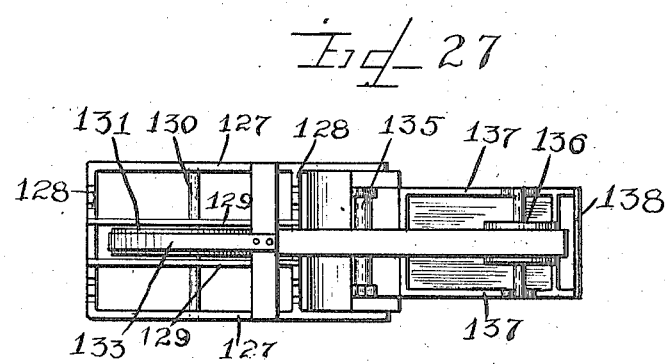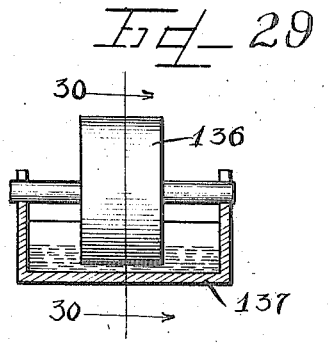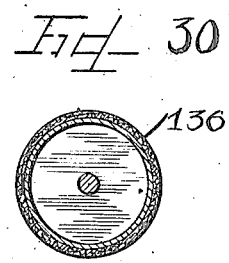

WILLIAM B. PIERCE AND FRANK M. PIERCE, OF CHICAGO, ILLINOIS, ASSIGNORS TO PIERCE WRAPPING MACHINE COMPANY, OF CHICAGO, ILLINOIS, A CORPORATION OF ILLINOIS.

WRAPPING-MACHINE.

1,158,278.

Specification of Letters Patent.

Patented Oct. 26, 1915.

Application filed August 7, 1911. Serial No. 642,685.

*To all whom it may concern:*

Be it known that we, WILLIAM B. PIERCE and FRANK M. PIERCE, citizens of the United States, and residents of the city of Chicago, in the county of Cook and State of Illinois, have invented certain new and useful Improvements in Wrapping-Machines; and we do hereby declare that the following is a full, clear, and exact description of the same, reference being had to the accompanying drawings, and to the numbers of reference marked thereon, which form a part of this specification.

Commodities of various kinds, such as coils of wire or of rope, vehicle tires and many other devices and commodities are constructed, or are put up for sale in annular packages, and these, if wrapped at all to afford a protective covering, have heretofore usually been wrapped by hand, a tedious and necessarily slow operation entailing considerable expense, and usually so applied as to afford an insufficient protection from injury during shipment or storage. Machines have rarely been used with success for the purpose of wrapping such bodies, owing to the delay occasioned in inserting into the machine, and removing from the machine the body to be wrapped, and also owing to the difficulty found in passing the wrapping material through the eye of the coil or annular package and around the same at a sufficiently high rate of speed to afford an economy over hand wrapping. Furthermore, although the wrapping may be applied spirally and sufficiently close to adhere under ordinary conditions to the body wrapped, it has been found that the rough usage received by the package during shipment frequently results in tearing or breaking the wrapping, whereupon the entire coil becomes unwound and the contents of the package exposed to injury.

The object of this invention is to afford a wrapping machine adapted to wind a band of wrapping material, for example, paper, spirally about the body to be wrapped and to secure the successive turns of the wrapping material firmly in place to prevent the release or unwinding of the wrapping, should it be torn at any point.

It is also an obejct of the invention to afford a machine adapted to operate at exceedingly high speed, and in which the balance of the shuttle is maintained substantially uniformly during the wrapping operation and independently of the quantity of wrapping material in the shuttle.

It is also an object of the invention to afford a construction in which a package of wrapping material is inserted in folded form into an annular shuttle adapted to revolve around the portion of the body to be wrapped, and in which the material as withdrawn from the shuttle, is relieved of the weight of the material in the shuttle by centrifugal action.

It is an object of the invention also to afford a construction in which a loosely supported annular shuttle is revolved at high speed around the portion of the body to be wrapped, and to afford in connection therewith, means for opening and raising the shuttle to release the wrapped body, and to afford adjusting mechanism for the shuttle capable of operating only when the power is cut off from the machine.

It is also an object of the invention to afford adjusting mechanism for the shuttle in a machine such as described, which is normally locked out of action when the machine is in use, and which can only be brought into action by first cutting off the power, said construction also necessitating the readjustment to operating position before the power can again be applied to drive the shuttle.

The invention involves numerous novel features of construction and operation, a preferred form of which is hereinafter more fully described and set forth and defined in the appended claims.

In the drawings: Figure 1 is a front elevation of a device embodying my invention, showing the parts in normal operating position. Fig. 2 is a similar view, showing the shuttle elevated and opened out of operative position. Fig. 3 is a side elevation thereof. Fig. 4 is a view in elevation of the opposite side of the machine, showing the same broken away and partly in vertical section. Fig. 5 is a top plan view with parts omitted, and with the upper center frame removed. Fig. 6 is an enlarged section taken through the shuttle and showing the wrapping material in elevation. Fig. 7 is a top plan view of the shuttle. Fig. 8 is an enlarged detail section taken through the clutch for the driving pulley. Fig. 9 is a face view of the clutch and driving pulley, showing the shaft in section. Fig. 10 is an enlarged detail sectional view of a part of the operating mechanism carried in the shuttle. Fig. 11 is a view in elevation taken in the direction of the arrow 11, shown in Fig. 10. Fig. 12 is an enlarged detail view of the latch for closing the outer wall of the shuttle. Fig. 13 is an enlarged section taken on line 13—13 of Fig. 6. Fig. 14 is an enlarged sectional detail taken on line 14—14 of Fig. 10 illustrating the construction and mounting of the folding device within the shuttle. Fig. 15 is an enlarged elevation taken on line 15—15 of Fig. 10 showing the opposite side of the folding device from that shown in Fig. 14. Fig. 16 is a front end elevation thereof. Fig. 17 is a transverse section of the shuttle, showing the tension adjusting mechanism in elevation. Fig. 18 is a section on line 18—18 of Fig. 10, taken longitudinally of the tension adjusting mechanism and showing the adjusting bolt and web member in elevation. Fig. 19 is a section taken on line 19—19 of Fig. 18. Fig. 20 is an enlarged fragmentary detail of the adjusting mechanism for the shuttle. Fig. 21 is a section on line 21—21 of Fig. 20. Fig. 22 is a section on line 22—22 of Fig. 21. Fig. 23 is a section on line 23—23 of Fig. 22. Fig. 24 is an enlarged fragmentary section and detail of the wire bobbin and tension therefor. Fig. 25 is an enlarged end elevation of the spindle for the wire bobbin, showing the bolt therefor in section. Fig. 26 is an enlarged fragmentary detail illustrating the mounting of the binding strip or tape upon the machine. Fig. 27 is a top plan view thereof. Fig. 28 is a fragmentary front elevation, showing the cutter for the binding tape. Fig. 29 is a section on line 29—29 of Fig. 26, with the moistening roll and shaft in elevation. Fig. 30 is a section on line 30—30 of Fig. 29.

As shown in the drawings, an upright frame comprising side frame members 1 and 2, and connecting horizontal upper and lower beams 3 and 4, are connected transversely each with the other near the base by beams 5, one at the front and one at the rear thereof. Said side frame members at their front and rear sides respectively extend upwardly above the transverse beams 3, to afford a relatively low front standard 6, and higher rear standards 7, one on each side the machine, and connecting said rear standards at their upper ends is an upper bear 8, which arches upwardly at its middle. Secured on said top beam 8, at its middle, on each side the center, are upwardly extending parallel standards 9, affording a guide slot therebetween. Said standards may be integrally connected with the beam and with each other at the upper ends thereof, if preferred, as shown in Figs. 1 and 2.

Rigidly secured on the lower transverse beams 4, and extending across the machine, is a bar or beam 10, and supported thereon and extending upwardly therefrom are parallel cylindric guide bars 11, one on each side the machine, the upper ends of which, as shown, are rigidly secured upon a bracket 12, secured on the inner side of the respective frame members, and extending forwardly and inwardly therefrom. Slidably supported on said vertical guide bars 11, is a carriage, comprising side frame members 13, which are provided near the rear side thereof with outwardly extending upper and lower brackets 14 and 15, which are provided at their outer ends with sleeves 16, in vertical alinement, which receive said guide rods therethrough and slide thereon. As shown, a transverse web or bar 17, connects said side frame members affording an exceedingly rigid construction. Journaled horizontally at the front and the rear of the carriage between said side members, are friction rollers 18 and 19, of relatively large size, the surface of which may be milled or slightly roughened or covered with any suitable investing material to assist in frictionally driving the article to be wrapped when supported thereon, as shown in Figs. 1 and 2, and, as shown, the shafts for said friction rollers or wheels 18 and 19, are extended beyond the side frame members on one side thereof, and are provided each with a sprocket wheel 20, to receive a sprocket chain 21, about the same, whereby said rollers are driven simultaneously and at equal rate in the same direction. Mounted upon said side frame members for the carriage, are forward and rear guide rollers 22 and 23. Pivotally engaged on said carriage at the bottom of one of said side frame members, is a lever 24, which engages at one of its ends in any of the hooks or links 25, suspended at different heights upon a vertical bar 26, provided therefor, as shown in Figs. 3 and 4, and which is rigidly supported upon the frame of the machine in any suitable manner. At the opposite side of the machine therefrom, is an upwardly extended screw shaft 27, which at its lower end is suitably supported on the frame and at its upper end is journaled in a bracket 28, secured to the top of one of the front standards of the machine, and at its upper end is provided with a crank 29, whereby the screw shaft may be rotated. A nut 30, is provided on said shaft and held from rotation thereon by means of a metallic strap or bar 31, which is secured at its upper end on said nut and at its lower end on the otherwise free end of the lever 24, so that rotation of the screw shaft serves to adjust the carriage upwardly or downwardly, dependent upon the direction of rotation thereof, thus permitting accurate adjustment thereof as to height. Quick adjustment of the carriage may, of course, be effected by engaging the other end of the lever 24, on one or the other of the hooked links 25. A driving shaft 32, is journaled on the front and rear standards of one of said side frame members provided with a driving pulley 33, which is secured thereon by means of a clutch hereinafter described. Said shaft is provided with a worm 34, thereon, near the rear side of the machine, which meshes with a worm gear 35, secured on a vertical shaft 36, on which is feathered a bevel gear 37, which meshes with a bevel gear 38, secured on the end of the shaft for the friction pulley 19, at the opposite end thereof from the sprocket wheel 20, before described, so that said friction pulleys or wheels are driven continuously from the driving shaft independently of the vertical adjustment of the carriage. Secured on said shaft 32, directly above the middle of the carriage before described, are parallel guide disks 39, and 40, which are of substantially equal diameter, and of which, as shown, the rear disk comprises a plain inner supporting rim and an outer geared rim of substantially equal diameter, as shown in Figs. 3, 4, and 5. Secured upon a shaft 41, on the opposite side of the machine and parallel with the shaft 32, are corresponding idle guide and supporting disks 42 and 43. Said disks support thereon and therebetween the annular revoluble shuttle wherein is carried the wrapping material. Said shuttle comprises two segment members articulated together and affording therein a compartment to receive the wrapping material, and comprises apertured side wall members 46 and 47, articulated together at their meeting ends by means of a rivet 48, secured therethrough to afford a pintle. Said side walls are connected transversely by means of a web or plate 49 and 50, affording one end of the carton compartment, and also by means of transverse pins or rivets 51, on diametrically opposite sides thereof, which hold the side walls of the shuttle spaced equal distances apart, and which also serve to secure thereto the lower half 52, of the sheet metal outer peripheral wall for the shuttle. As shown also, the meeting ends of the shuttle segments are provided with transverse end walls 53, which register against each other when the shuttle is closed, and are provided with registering apertures, through which extends a spring pressed bolt 54, secured in one of the shuttle segments. As shown, approximately half the outer peripheral wall for the shuttle is hinged to open outwardly therefrom to permit the insertion of the wrapping material X, in the folded half, as shown in Fig. 6. For this purpose, a short leaf 55, is engaged on each of the pintles 51, and is connected by means of a pintle 56, with longer leaf sections 57 and 58. As shown, the section 57, is provided with a tongue 59, adapted to pass through a corresponding slot in the outer end of the plate 58, as shown in Figs. 6 and 12, and to rest upon a transverse bar 60, secured across said slot on the inner side said plate at the extremity thereof.

A bolt 61, is slidably engaged on the inner side of the cover plate 58, and at its outer end curved upwardly and outwardly to engage over the tongue 59, on the plate 57. As shown, pulling springs 62, are secured on said bolt and on the rigidly secured transverse bar 60, and act to hold said bolt forwardly or in engaging position, and finger apertures are provided through both said cover plates 57 and 58, to permit the retraction of the bolt to release said plates, the one from the other. Said shuttle is provided on its forward side wall with a peripheral rim or flange 63, which tracks upon and between the guide disks 40 and 43, as shown in Figs. 1 to 4 inclusive, and on its rear side wall is provided with a corresponding flange or rim 64, to track on the corresponding plain portion of the guide disk 39 and the guide disk 42, and a geared rim 65, is secured on the outer side thereof to mesh with the geared portion of said guide disk 39, whereby the shuttle is continuously driven from the driving shaft 32. The shuttle segments are provided with inner periperal walls 66 and 67.

As shown, parallel guide rollers 68, are provided near the hinge in the inner peripheral wall 67, of the shuttle near the hinged end of the inner walls and between which the paper or other wrapping strip X, is fed inwardly from the carton or package. As shown, a filler is provided to prevent any portion of the wrapping material fouling with the opening and closing of the shuttle by engaging between the hinged portions of the shuttle. For this purpose, as shown, a transverse bar or plate 69, is secured continuously with the inner wall 67, and in close relation with said guide rolls and secured thereon is a spring plate or bridge member 70, which extends within the other shuttle segment and bears on the inner wall 66, thereof, as shown in Figs. 6 and 13, so that when the shuttle opens, as shown in Fig. 2, the package of wrapping material within the shuttle is supported thereon at its middle.

Within a compartment or space provided therefor at the end of the shuttle segment from which the wrapping material is drawn, as shown in Fig. 6, is a tension device for the wrapping material, and a folding mechanism for folding the wrapping strip longitudinally before wrapping the same about the body to be wrapped. Said tension device comprises a spring plate 71, secured transversely in the end of said shuttle segment and free near the outer periphery of the segment, as shown in Figs. 17, 18 and 19. Pivotally engaged upon a pintle 72, extending through the side walls of the segment, is a lever 73, the outer end or that directed toward, and bearing against the free end of the spring 71, having a roller 74, journaled thereon. Secured on the inner end of said lever 73, is an angular sleeve 74ª into which extends a wedge member 75, comprising a nut threaded on a screw shaft 76, extending through the side walls of the section, and provided with a head at one end shaped to be engaged by a suitable tool to rotate said screw to adjust the wedge inwardly or outwardly and thereby swing the outer end of the lever toward or from the spring plate 71. As shown, a leaf spring 77, is engaged at its ends on said bolt and bears at its middle portion against the inner end of the lever and tends at all times to hold the inner end of the lever outwardly from the wedge, as indicated in Fig. 18.

Pivotally engaged in the end of the shuttle segment adjacent the roller 74, for the tension device, is the folder for the wrapping material. This comprises as shown, a plate 78, engaged at one end on a suitable pin or pintle 79, secured through the side walls of the segment and curved outwardly from the rollers 74, and directed inwardly toward the article to be wrapped. Integrally connected therewith at one side thereof is a guide plate 80, of sufficient width at the receiving end thereof to receive the paper therein at its full width, and tapering to its free extremity to afford a narrow restricted nozzle and turned at its free edge over the plate 78, to bend or fold the wrapping material thereover as it is drawn therethrough. Within a corresponding compartment in the other shuttle segment, a wire spool or bobbin 81, is journaled and adjacent thereto is a tension roller 82, provided with a central groove thereon about which the wire may be turned one or more times to afford the requisite tension before being applied to the article to be wrapped. As shown, the spindle or shaft 83, for the wire bobbin, is relatively large and is secured in place by means of a screw or bolt 84 which extends through said shaft and is threaded into the side wall of the segment. As shown, a spring plate 85, is secured on the shaft of said screw or bolt and frictionally engages the shaft 83, for said binder to hold the same from rotation while the bobbin is revolving thereon.

The bolt 54, whereby the shuttle segments are locked in closed position, is pivotally engaged on a suitable pintle 86, extending through the shuttle segment and is normally held in engaging position by means of a spring 87, which bears on the free end or tail thereof, as shown in Figs. 6 and 10. As shown, a serrated cutter 88, is provided at the end of the shuttle segment, adjacent the folder, in convenient position to permit the wrapping material to be pressed thereagainst to sever the same when the wrapping is completed.

Mechanism is provided for opening the shuttle to permit the insertion or removal of the article to be wrapped, and for closing the same preliminary to wrapping, and for this purpose suitable mechanism assisted by gravity, is utilized, and mechanism is also provided to prevent the opening of the shuttle until the power is disconnected and to prevent the drive being applied to the shuttle until the shuttle is fully closed.

For opening the shuttle, toggle bars 89 and 90, are mutually engaged upon a pivot bearing 91ª, to the upper or head beam 8, and pivotally engaged at the upper end of each are links 91 and 92, which are mutually pivoted at their upper ends on a pivot bolt 93, which, at its rear end slidably engages in the vertical slot or guideway between the guide standards 9, as shown in Fig. 4. Said links are made large to afford weights to partly counterbalance the weight of the shuttle, and its load of paper.

The toggle bars 89 and 90, extend downwardly and laterally and near their lower ends extend forwardly into the space between the guide disks 39, 40, 42 and 43, and are pivotally engaged at their lower ends with the inwardly curved lifting hooks 94, one on each side of the machine and positioned to slide over the shafts 32 and 41, respectively, between said guide disks. Said lifting hooks are each provided on the back thereof with a downwardly extending hook or finger 95, adapted to engage over the respective shafts, as shown in dotted lines in Fig. 1, and at their lower extremities are provided with inwardly and upwardly directed hooks or fingers 90, adapted to engage, as shown in Fig. 2, in the recesses Y and Y¹, near the meeting ends of the shuttle segments to raise and support the shuttle while opening the same. As shown also, a safety guard 97, is provided for said shuttle, which engages over the plain rim 64, at the rear side of the shuttle, as shown in Figs. 1 to 4 inclusive. This, as shown, comprises two segment shaped bars 97 and 98, hinged together at their inner ends above the middle of the shuttle, and at their outer ends provided with outwardly directed integral arms 99 and 100, respectively, which pivotally engage an upwardly directed arm or arms 101, rigidly (and, if preferred, integrally) secured on the toggle levers 89 and 90, in alinement with the rear plain rim on the shuttle. The length of said guide bars and the arrangement is such that the guide bars bear loosely upon the plain rim at the top of the shuttle when the shuttle is inclosed or in operative position, as shown in dotted lines in Fig. 1, and in full lines in Figs. 2 and 3, while the adjustment of the toggle arms to the position shown in Fig. 2, serves to elevate the guard bars and swing the lower ends thereof outwardly to permit the elevation and opening of the shuttle on the hooks 96, engaged in the apertures Y and Y¹ therefor in the shuttle.

An actuating lever 102, for the toggle bars is supported upon a fulcrum pin 103, at the operating side of the machine, and a notched segment 104, is secured to the frame of the machine adjacent said lever, adapted to be engaged by the usual spring impelled detent 105, secured on the lever, as shown in dotted lines in Fig. 3. Secured to the inner end of said lever 102, is a rod 106, which, at its upper end is pivotally engaged on the extended upper end of the toggle bar 90. As shown, two notches are provided in said segment to receive said detent, an upper notch to engage said lever at the position shown in Fig. 2, with the shuttle elevated and opened, and a lower to elevate and support the toggle bars when the shuttle is inclosed or in running position, as shown in Figs. 1, 3 and 4.

A lock is provided to prevent adjustment of the adjusting lever for the shuttle in either of its adjusted positions until proper adjustment for the drive of the machine has been effected. For this purpose, the driving pulley 33, is rotatably mounted on the shaft 32, and is provided at its side adjacent the machine with an integral inwardly directed clutch member 107, as shown, the female member of a cone clutch. A collar 108, is rigidly secured on the shaft in said clutch member and a collar 109, is secured on the outer end of the shaft 32, and bears against the hub of the driving pulley 33, as shown in Fig. 8, and holds said pulley and clutch member from movement longitudinally of the shaft.

Splined on the shaft is a male clutch member 110, complemental with the female clutch member 107, and adapted to drive the shaft therefrom. The hub 111, thereof, is provided with a peripheral groove in a familiar manner to engage the complementally flanged shifting collar 112, which is provided with laterally directed pins 113, which engage in the slotted arms of a yoke 114, secured on the end 115, of a shifting lever, which is suitably fulcrumed on the frame, and the other end 116, of which extends forwardly to convenient operative position, as shown in Fig. 3. A link or rod 117, is pivotally engaged on said end 116, of the power shifting lever, and extends downwardly through a housing 118, integral with the segment 104, on the opposite side thereof from the adjusting lever and between rollers 119 and 120, journaled in an apertured head 121, of a locking bolt 122. Said bolt 122, projects through the segment in position to engage above the lever 102, when in its lower or the running position, and to engage against the inner face of said lever, as shown in dotted lines in Fig. 20, when in its upper adjustment or when the shuttle is open.

As shown, cam projections 124 and 125, are provided on opposite sides of the link 117, which pass through said head 121, and shift the head to retract the pin when the lever 116, is thrown downwardly to retract the clutch, thereby permitting the adjusting lever to be thrown upwardly to open the shuttle. When said adjusting lever is elevated to the position shown in Fig. 2, and in dotted lines in Fig. 20, said pin 122, bears against the inner face of said lever or against an extension 126, on the under side of the lever and holds said pin retracted and thereby locks the clutch lever 116, from movement to again engage the clutch to turn on the power. This arrangement necessitates the closing of the shuttle and the return of all parts to running position before the power can be turned on.

Means are provided for binding the successive turns of the wrapping material firmly to each other and in place. For this purpose, a rearwardly directed bracket 127, is secured on each side of the standards 9. Said bracket, as shown, comprises a rectangular frame having forward and rear transverse bars 128, extending thereacross and notched on their upper surface to receive the adjustable guide bars 129, as shown in Fig. 27.

Extending through the side frame members of the brackets 127, intermediate the transverse bars 128, is a removable shaft 130, of any suitable kind, adapted to receive thereon between the guide bars 129, a narrow strip of paper or other suitable material in a roll 131. Extending upwardly from the brackets 127, is a frame 132, secured centrally to which and directed rearwardly is a strap 133, which extends over said roll and is provided with a weight 134, to maintain tension on said roll at all times. Said strip is coated with adhesive material of any suitable kind on the under side and the end of said strip is led upwardly over a roller 135, at the top of the frame and thence over a moistening roller 136, journaled on the side walls of a trough 137, adapted to contain water for moistening the adhesive. The strip thence extends downwardly at the front of the machine in position to be engaged by the operator and applied to the outer side of the wrapping for the coil or annular body, as the wrapping progresses.

As shown, a transverse cutter bar 138, is supported in the front end of the trough and spaced a distance from the front wall thereof to permit the paper strip to pass between said front wall and said cutter, and, as shown, the cutting edge of said cutter is serrated to facilitate severing the strip when the wrapping is completed.

Slidably secured in suitable brackets on the front and rear standards, and, as shown, above the shafts 32 and 41, are inwardly projecting rods 139, each of which is provided at its inner end with a yoke 140, having journaled therein a guide roller 141, adapted to engage on opposite sides of the annular body to be wrapped, and to steady and guide the top thereof during the wrapping operation. As shown, the front and rear rods 139, on the same side of the machine are rigidly connected at their outer ends by means of the link or bar 142, as shown more fully in Fig. 5, and set screws 143, are provided in the bearings for said rods to rigidly engage the same to hold the rollers 141, in their adjusted position relatively the article or body being wrapped.

The operation is as follows: With the machine adjusted as shown in Fig. 2, that is to say, with the shuttle elevated and opened and the power turned off, the annular body to be wrapped, as, for example, a coil of wire, an automobile tire or any of the numerous bodies of annular form to which it may be desired to apply protective covering, is delivered upon the rollers 18 and 19, journaled upon the feed carriage and the carriage is adjusted, if necessary, upwardly or downwardly by means of the crank 29, which rotates the screw shaft 27, thereby moving the carriage upwardly or downwardly when necessary to permit the shuttle to engage through the eye thereof when the shuttle is closed and in operative position, as shown in dotted lines in Fig. 1. Having properly positioned the article to be wrapped, the adjusting lever 102, is moved downwardly to its lower or running position, thereby releasing the pin and permitting the shifting lever 116, to be moved upwardly thereby projecting the bolt or pin 122, into engagement over the adjusting lever simultaneously bringing the aforesaid clutch members into positive driving relation to rotate the shuttle at a relatively high speed, and the feed rollers 18 and 19 at a relatively low speed. Of course, the shuttle is broughht into operative position and the shuttle segments closed and positively locked partly by gravity and also by the upward thrust of the connecting rod 106, whereby the weighted toggle levers 91 and 92, are forced upwardly, carrying the upper ends of the toggle arms or levers 89 and 90, therewith and thereby projecting the bars 94, having the lifting hooks thereon, downwardly to the position shown in Fig. 1, and releasing the shuttle. This downward movement of the lifting hooks or tongs also brings the jointed guard bar into positive engagement with the plain rim on the rear of the shuttle, as shown in Figs. 1 to 5 inclusive, and the shuttle is thus firmly held between the guide disks 39 and 40, 42 and 43, and is supported upon the plain rims on the inner side thereof with the geared rim of the shuttle meshing with the gear on the guide disk 39. The wrapping material is now drawn through the folder of the shuttle, as shown in Fig. 6, and applied to the article Z, shown in dotted lines in Figs. 1, 2 and 6, which it is the purpose to wrap. The shifting lever is now thrown up to running position, as shown in Figs. 1 and 3, bringing the clutch members on the driving shaft into engagement whereby the shaft 32, is driven, thereby rotating the shuttle by the direct drive with the gear 39, and also driving the feed rollers 18 and 19, from the worm 34, on said shaft 32, which drives the shaft 36, the feed roller 19, and thence, through the medium of the sprocket wheel and chain 21, drives the feed roller 18, thereby rotating the article to be wrapped at a relative slow but uniform rate. Owing to the high speed of rotation of the shuttle, the package of folded paper therein is thrown outwardly by centrifugal action, relieving all pressure from the inner folds thereof from which the paper is drawn, thus obviating any tendency to tear the paper, which passes around the tension roller 74, and thence through the folder before described, where the paper is folded longitudinally, so that the outer edge of the spirally wrapped strip is of double thickness as applied to the coil or annular body. As the wrapping progresses, the end of the adhesive strip is applied peripherally and centrally to the wrapping, and as the wrapping progresses, is drawn by the movement of the body wrapped, around the periphery of the wrapping, adhering to the overlapped wrappings and firmly binding successive turns thereof together and affording as well an additional thickness of protecting material around the periphery. As the wrapping nears completion, the adhesive strip is severed on the cutter 138, provided for that purpose to afford a sufficient length to complete the winding strip about the periphery of the object wrapped, and the end of the wrapping strip is cut on the cutter 88, for that purpose on the end of the shuttle section, and said cut end is sealed to the wrapping by said adhesive binding strip. The wrapping now being completed, the shifting lever is thrown downwardly releasing the clutch and also retracting the bolt 122, whereby the adjusting lever has been locked during the wrapping operation from movement. The lever 102, is now moved to its upper position or that indicated in Fig. 2, thereby leaving the weighted toggle levers 91 and 92, unsupported, permitting the same to descend, and assisting such descent by the downward draft on the rod 106, whereby the upper ends of the toggle levers 89 and 90, are drawn downwardly, thereby lifting the lower ends thereof and elevating the grappling hooks into engagement with the periphery of the shuttle in position for one of said grapping hooks 96, (which is slightly longer than the other) to engage in the aperture $Y^1$, therefor for the shuttle, thereby centralizing the shuttle for the engagement of the other of said hooks in the aperture Y. Such engagement releases the bolt 54, permitting the lower ends of the shuttle segments to swing outwardly, as shown in Fig. 2, to open the shuttle as the shuttle rises, and permitting the wrapped object to be removed from the feed carriage and another to be wrapped, substituted therefor.

Of course, it is important for the purpose of economizing time, to bring all the mechanism to rest as quickly as possible after the completion of the wrapping, and, for this purpose, a friction brake, operated by the shifting lever simultaneously with the shifting of the driving clutch, is utilized. As shown, a friction rim 150, is provided on the front face of the guide disk 40, and a lever 151, is pivotally supported on the frame of the machine with one end thereof directed outwardly into position to be engaged and shifted downwardly by the shifting lever 116, and is actuated to release the clutch. On the other end of said lever is a brake shoe 152, adapted to engage the friction band or rim 150, on said guide disk to bring the mechanism promptly to rest. Of course, when the shuttle is closed, the shifting of the driving clutch by means of the lever 116, simultaneously releases the brake.

The construction of the shuttle before described permits the maximum quantity of wrapping material to be contained therein to enable a large number of objects to be wrapped without refilling the shuttle, and furthermore, inasmuch as the wrapping material is withdrawn from the inner side of the package of folded wrapping material, no resistance to withdrawal is exerted by the weight of the paper in the shuttle. Said paper is inserted in the shuttle ready folded, as shown in Fig. 6, by retracting the bolt 61, whereby the hinged sections 57, are immediately engaged together at their free ends and folding said hinged sections outwardly affording an unobstructed access to the interior of the shuttle.

The wire bobbin may, of course, be removed when not required. When required, the wire is passed around the object and wound over the paper both wrappings being applied simultaneously. When the shuttle is opened to the position shown in Fig. 1, the plate 70, within the shuttle (which is secured to the inner wall of one of the sections) is drawn along the inner wall of the other to bridge the gap and to support the inner layers of the wrapping material from protruding into the gap, thereby preventing injury to the paper when the shuttle is closed.

We have shown but one (and that the preferred) form of a high speed machine embodying our invention, and we have referred in the specification to the wrapping of annular bodies. It is obvious, however, that numerous variations and modifications in the construction of the machine may be made without departing from the principles of this invention, and that the machine is adaptable for wrapping bodies of any kind that may be passed through the eye of the shuttle, as, for example, a rod, bar or tube, and many other objects. We therefore do not purpose limiting ourselves otherwise than necessitated by the prior art.

We claim as our invention:

1. A wrapping machine embracing supporting means for the object to be wrapped, a rotatable annular shuttle through which the body to be wrapped is passed, driving connections for the shuttle, a power shifting mechanism therefor, adjusting means for the shuttle, and mutually interlocking mechanisms whereby the adjusting means for the shuttle are held inoperative during operation of the shuttle and whereby the power shifting mechanism is held inoperative during adjustment of the shuttle.

2. A wrapping machine embracing supporting means for the object to be wrapped, a rotatable annular shuttle, means moving the body to be wrapped therethrough, driving connections for the shuttle, a power shifting mechanism therefor, adjusting means for the shuttle, and mutually interlocking mechanisms whereby the adjusting means for the shuttle are held inoperative during operation of the shuttle and whereby the power shifting mechanism is held inoperative during adjustment of the shuttle.

3. In a device of the class described an adjustable support for the article to be wrapped, a shuttle having wrapping material therein, revoluble about the object to be wrapped, means operated by rotation of the shuttle for drawing the wrapping material therefrom, driving mechanism for the shuttle, controlling means therefor, adjusting members for the shuttle, said means and members each acting in one position to lock the other out of action.

4. In a device of the class described an adjustable support for the article to be wrapped, a shuttle having wrapping material therein and revoluble about the object to be wrapped, means operated by rotation of the shuttle for folding the wrapping material as drawn from the shuttle, driving mechanism for the shuttle, a controlling member therefor, adjusting means for the shuttle, said member and latter means each acting in one position to lock the other out of action.

5. A wrapping machine embracing a rotatable annular shuttle having folded wrapping material therein adapted to be drawn therefrom by the rotation of the shuttle, mechanism for rotating the shuttle at high speed, a brake for the shuttle, a clutch controlling the application of power to the shuttle, and a shifting lever for the clutch acting to simultaneously release the clutch and apply said brake.

6. A wrapping machine embracing a rotatable annular shuttle having folded wrapping material therein adapted to be drawn therefrom by the rotation of the shuttle, mechanism for rotating the shuttle at high speed, a brake, a clutch controlling the application of power to the shuttle, and a shifting lever for the clutch acting to simultaneously release the clutch and apply said brake.

7. A device of the class described embracing means for supporting and advancing the object to be wrapped, a source of power, a driving shaft, a clutch, a hollow shuttle driven thereby and carrying wrapping material therein and revoluble about said body and acting by its rotation to draw the wrapping material therefrom, and wind the same spirally about said body, a lever for releasing the clutch, and a brake comprising a brake rim, a brake shoe and a lever adapted to thrust said shoe against said rim, said lever operated by said clutch lever and acting to immediately stop the rotation of the shuttle with the releasing of the clutch.

8. A device of the class described embracing a source of power, a driving shaft, a clutch, means operated from said shaft for supporting and feeding the body to be wrapped into the machine, a shuttle also driven thereby and carrying wrapping material therein and revoluble about said body and acting by its rotation to draw the wrapping material therefrom and wind the same spirally about said body, a lever for releasing the clutch, a brake drum, a brake shoe, a lever to operate the same adapted to be operated by said clutch lever and acting to immediately stop the rotation of the shuttle with the releasing of the clutch, and manually actuatable means acting to release the shuttle from the article wrapped.

9. In a wrapping machine for annular bodies, an adjustable carriage, power driven feed rollers thereon to support and rotate the body to be wrapped, an annular shuttle rotatable through the eye of said body, a source of power, shifting means for releasing the power from the machine, a friction brake operated by said shifting lever and acting to positively arrest the movement of the shuttle after the cutting off of the power, and a lock acting to positively hold the driving connections out of action until the removal of the object wrapped and the normal engagement of another object to be wrapped therein.

10. In a wrapping machine for annular bodies, a source of power, an adjustable carriage, power driven feed rollers thereon to support and rotate the body to be wrapped, an annular shuttle rotatable through the eye of said body from said source of power, shifting means for releasing the power from the machine, a friction brake operated by said shifting lever and acting to positively arrest the movement of the shuttle after the cutting off of the power, a lock acting to positively hold the driving connections for the machine out of action until the removal of the object wrapped and the normal engagement of another object to be wrapped therein, and means applying a binding tape to the periphery of the wrapping as the wrapping progresses.

11. In a device of the class described an annular shuttle comprising hingedly connected sections, means locking the sections of said shuttle closed in operative position, and mechanism for supporting and delivering a flexible adhesive strip upon the wrapping applied by the shuttle and at an angle therewith.

12. In a device of the class described a source of power, an annular shuttle comprising hingedly connected sections, means locking the shuttle sections in operative closed position, mechanism for supporting and delivering a flexible adhesive strip to the wrapping applied by the shuttle and at an angle therewith, and means for unlocking said shuttle sections one from another to permit removal of the wrapped article from the device.

13. A wrapping machine embracing a source of power, a driving shaft, an annular shuttle having wrapping material carried therein; connections with said shaft for driving the same at a high rate of speed, means for opening said shuttle to permit the insertion of the same through the eye of an annular body, a lever for operating the same, a lever for shifting the power from said shaft, and means locking either lever from movement when the other of said levers is in one of its adjusted positions.

14. A wrapping machine embracing a source of power, a driving shaft, an annular shuttle having wrapping material loosely carried therein, connections with said shaft for driving the shuttle at a high rate of speed, means for opening said shuttle to permit the insertion of the same through the eye of an annular body, a lever for operating the same, a lever for shifting the power from said shaft, and means locking either lever from movement when the other of said levers is in one of its adjusted positions, and counterweights acting to balance the weight of the shuttle.

15. In a machine of the class described, a source of power, a carriage for supporting and feeding the object to be wrapped, rotative mechanism driven at high speed from said source of power for applying wrapping material to said object, a guard normally engaging said wrapping mechanism to hold the same in operative position, mechanism adapted to operate simultaneously to arrest the motion of the wrapping mechanism and to disconnect the power, adjusting means for the wrapping mechanism, and a lock acting to hold said adjusting mechanism out of action when the power is applied and to permit the application of power only when the wrapping mechanism is in normal running position and adjustment.

16. In a machine for wrapping annular bodies, means for supporting and rotating said bodies, an annular shuttle carrying wrapping material comprising hinged sections, means for rotating the shuttle through the eye of the body to be wrapped, manually operatable mechanical means acting to open and release the shuttle from the article when fully wrapped, guide rollers on each side of the shuttle acting to support the article wrapped against the tension exerted by the shuttle, and means acting to deliver a band of adhesive tape to the periphery of the wrapping.

17. In a machine for wrapping annular objects, feed rolls for supporting and rotating said objects, an annular shuttle rotatable through the eye thereof and having wrapping material loosely contained therein, folding, guiding and tensioning mechanism acting to fold and direct the wrapping material spirally around the article wrapped, and means operated in part by the rotation of the object wrapped for applying an adhesive tape transversely of the wrapping as the wrapping progresses.

18. In a machine of the class described, an annular shuttle comprising a plurality of hingedly connected sections, means on said machine to open said shuttle sections to permit insertion or removal of an article to or from the machine, and mechanism adapted to operate simultaneously to shift the power and to actuate said shuttle opening means.

19. In a wrapping machine, a rotatable annular shuttle, a compartment therein adapted to carry wrapping material, said shuttle adapted to be opened without disturbing the wrapping material, means on the machine for opening the shuttle, driving mechanism for the shuttle, and a brake drum and brake shoe associated therewith adapted to check the rotation of said shuttle.

20. In a tire wrapping machine, a shuttle adapted to apply a spiral wrapping on a tire, means for applying another wrapping on the outer periphery of the spirally wrapped tire, parallel to the axis of said first wrapping, and mechanism forming a part of said machine for holding said tire in upright position and adjustable for tires of different size.

21. In a wrapping machine for applying a helical wrapper to an annular shaped article, means for applying another wrapper on the outer periphery of the article on said first wrapper, and mechanism adjustable for articles of different size for supporting an article in upright position independently of the wrapping means.

22. In a machine of the class described, means for applying transverse and longitudinal wrapping strips simultaneously one upon the other upon an annular body, and mechanism adjustable for bodies of different size to support the same in upright position for wrapping.

23. In a wrapping machine of the class described, means for applying a wrapper and a retaining wire therewith to an annular shaped article, means applying a wrapping strip simultaneously on the outer periphery only of said first wrapper, and mechanism adjustable for articles of different size to support an article in position for wrapping.

24. In a wrapping machine, means for applying a plurality of paper wrappers one transversely and the other longitudinally on an annular body, means on said machine permitting each wrapper to be severed from the body after completion of the wrapping, and mechanism adjustable for bodies of different size to support the same in proper position for wrapping in the machine.

In testimony whereof we have hereunto subscribed our names in the presence of two subscribing witnesses.

WILLIAM B. PIERCE.
FRANK M. PIERCE.

Witnesses:
LAWRENCE REIBSTEIN,
CHARLES W. HILLS, Jr.